United States Patent [19]

Ando et al.

[11] Patent Number: 4,578,025
[45] Date of Patent: Mar. 25, 1986

[54] DIE ASSEMBLY FOR EXTRUDING MULTILAYER PARISONS

[76] Inventors: Kazuo Ando, 18-14, Hirata 2-chome, Ichikawa-shi, Chiba-ken; Yoshiaki Matsuo, 33-13, Hanada 1-chome, Koshigaya-shi, Saitama-ken, both of Japan

[21] Appl. No.: 673,589

[22] Filed: Nov. 21, 1984

[51] Int. Cl.⁴ .............................................. B29C 47/06
[52] U.S. Cl. ................... 425/133.1; 264/173; 425/381; 425/466
[58] Field of Search ................. 425/133.1, 133.5, 190, 425/192 R, 192 S, 376 A, 380, 381, 462, 463, 466, 467, 532; 264/173, 541

[56] References Cited

U.S. PATENT DOCUMENTS

| | | | |
|---|---|---|---|
| 4,047,868 | 9/1977 | Kudo et al. | 425/462 |
| 4,171,195 | 10/1979 | Klein et al. | 425/466 |
| 4,218,416 | 8/1980 | Gokcen | 425/466 |
| 4,279,857 | 7/1981 | Feuerherm | 425/466 |
| 4,432,718 | 2/1984 | Wurzer | 425/466 |
| 4,472,129 | 9/1984 | Siard | 425/466 |

Primary Examiner—Jay H. Woo
Assistant Examiner—J. Fortenberry

[57] ABSTRACT

A die assembly for extruding multilayer parisons which is excellent in controlling the respective thicknesses of the resin layers of parisons and comprises a parison programming shaft; a core pin which is attached to the lowermost end of the parison programming shaft; a mandrel which encircles the parison programming shaft; a plurality of control rings which are mounted on the mandrel; a plurality of sleeves which are installed around the mandrel; a housing which holds the above members; a controlling member to control the resin quantity of the outer layer of parisons; a die supporting member; and a die; and characterized in that the resin passage of the die assembly is regulated by each of the control ring together with an annular rib that is formed on the inner wall of the sleeve; by the controlling member together with the lowermost sleeve; and by the die together with the core pin.

1 Claim, 2 Drawing Figures

DIE ASSEMBLY FOR EXTRUDING MULTILAYER PARISONS

BACKGROUND OF THE INVENTION (1) Field of the Invention

This invention relates to a die assembly for extruding multilayer parisons which parisons are used for subsequent blow molding of bottles or the like. More particularly, the invention relates to a die assembly for extruding multilayer parisons which comprises a plurality of layers of thermoplastic synthetic resins.

Furthermore, the present invention relates to the die assembly for extruding multilayer parisons in which different kinds of thermoplastic resins are thermally joined together in layers, thereby facilitating to produce blow molded articles that have several advantageous properties particular to the respective resin materials used.

(2) Description of the Prior Art

Blow molded articles have hitherto been widely used as containers for foodstuffs, chemicals, medicines, cosmetics, detergents and so forth. They have been, however, generally of a single layer structure. As the raw materials for the blow molded articles, thermoplastic resins such as polyethylene, polypropylene, polycarbonate, polystyrene and polyvinyl chloride are commonly employed.

In view of the public concern in recent years such as the saving of oil and electric resources, the disposal of waste plastic materials and the harmful effect of plastics in view of food sanitation especially in connection with the plasticizer contained in polyvinyl chloride products, it is required that the containers or bottles must be produced with possible minimum quantities of materials and, at the same time, the containers must satisfy the requirements in use and have no problem in view of environmental pollution and food sanitation. Nevertheless, the ordinary monolayer blow molded products are not able to satisfy simultaneously all the above-mentioned requirements, especially cannot meet the requirements for chemical stability, gas barrier property, and other properties of container walls.

Taking the laminated film materials into consideration, there are proposed various devices to introduce laminated structure into blow molding technique. That is, several properties of thermoplastic resins such as hardness, flexibility, tensile strength, gas permeability, chemical resistance and printability are different with the kinds of resins. While the outer surface of a bottle is liable to receive various external effects and influences and the appearance of the bottle is mainly influenced by the kind of material used. Furthermore, when a bottle is to be printed, the outer material must have affinity to printing inks. On the other hand, the inside surface of a plastic bottle comes into direct contact with the material contained therein, so that the inside surface of the bottle must neither react with the contents nor release any extraneous substance into the contents.

In view of the above facts, when plastic bottles are made double layer structure or multiple layer structure and most suitable materials are selected for respective layers, more desirable bottles can be produced from smaller amount of resin materials as compared with the conventional single layer bottles.

A proposal for such a purpose is described in U.S. Pat. No. 4,047,868, "Multilayer Parison Extrusion Molding Machine for Blow Molding". In this machine, it is possible to produce triple layer parison. However, when an outer layer and an inner layer are made by the resins which cannot be well joined together, the intermediate layer must be used for an adhesive material. In such a case, only double layer parisons are formed. Furthermore, it is not possible to produce parisons having more than three layers. Still further, due to the structure of die head, assembling and disassembling, and controlling of resin quantity are difficult and the leakage of resin is liable to occur during extrusion of parisons.

Meanwhile, in usual practice of plastic molding, it is necessary to use recycled material without discarding condemned goods and flashes or fins in order to reduce production costs. Therefore, parisons are composed of, for example:

a. Inner layer that is chemically resistant, innocuous, odorless, etc.
    b. Adhesive layer
    c. Gas-barrier layer
    d. Adhesive layer
    e. Recycled layer
    f. Outer layer that is shock resistant, scratch resistant, glossy, printable, etc.

In some case, a layer or layers having other characteristic properties may be interposed between the above layer materials to form parisons of five or more layer structure.

BRIEF SUMMARY OF THE INVENTION

In view of the above-described status of the prior art, the object of the present invention is to provide a die assembly for extruding multilayer parisons which meet the foregoing requirements.

Another object of the present invention is to provide a die assembly for extruding multilayer parisons which parisons are used for producing blow molded articles having advantageous characteristics.

A further object of the present invention is to provide a die assembly for extruding multilayer parisons which is simple in structure, easy and accurate in controlling and reliable in working.

The die assembly for extruding multilayer parisons of the present invention comprises a parison programming shaft which is driven by a parison programmer; a core pin which is attached to the lowermost end of the parison programming shaft; a mandrel which encircles the parison programming shaft; a plurality of control rings which are mounted on the mandrel at a predetermined intervals; a plurality of sleeves which are installed around the mandrel; a housing which holds therein the above members; a controlling member which is movably attached to the bottom part of the housing and around the lowermost sleeve; a die supporting member which is attached to the bottom face of the housing; and a die which is supported by the die supporting member and encircles the core pin.

The present invention is characterized in that the resin passage of the die assembly is regulated by each of the control ring together with an annular rib that is formed on the inner wall of the sleeve; by the controlling member together with the lowermost sleeve; and by the die together with the core pin.

BRIEF DESCRIPTION OF THE DRAWINGS

These and other objects and features of the invention will become more apparent from the following description taken in connection with the accompanying drawings in which.

DETAILED DESCRIPTION OF PREFERRED EMBODIMENT

Figure 1:
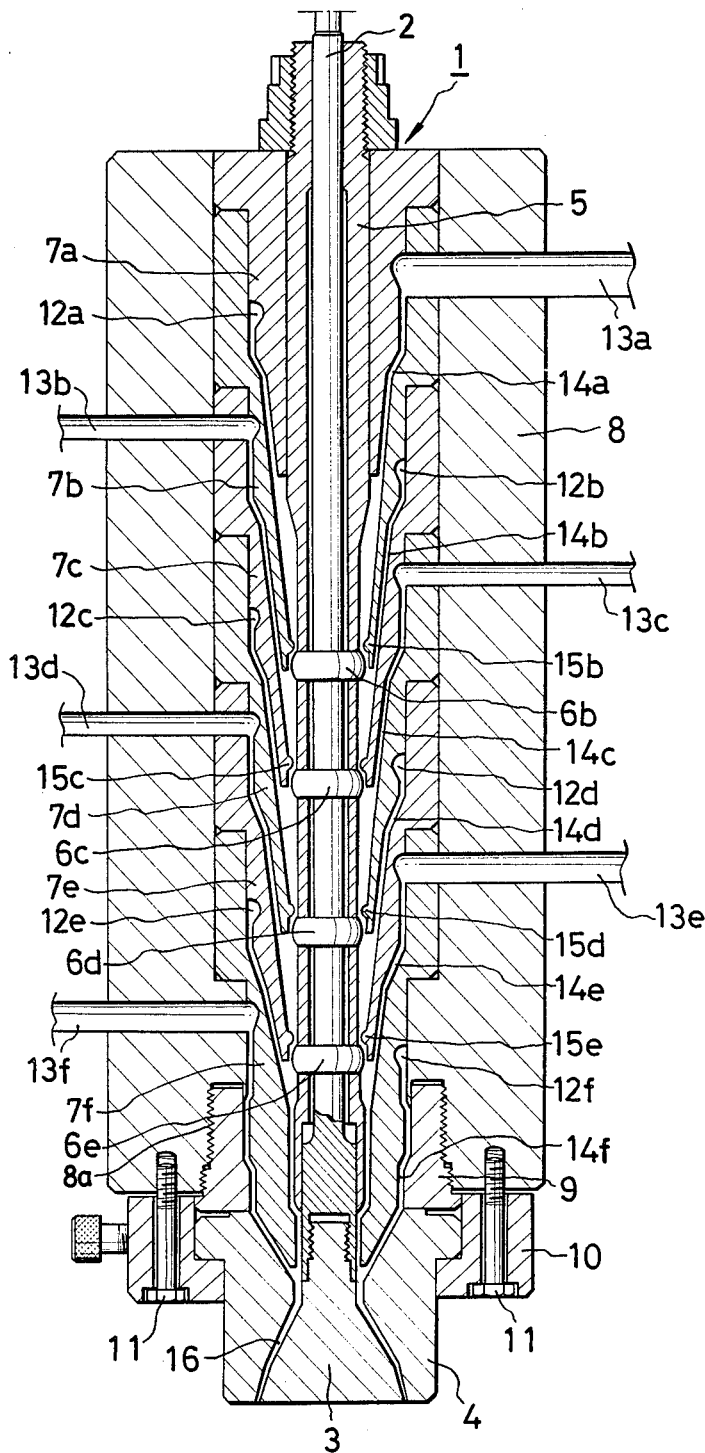
FIG. 1 is a vertical cross-sectional view of an embodiment of the die assembly for extruding multilayer parisons of the present invention.

The present invention will be described with reference to an embodiment shown in the attached drawings.

The die assembly for extruding multilayer parisons 1 of the invention comprises a parison programming shaft 2; a core pin 3 which is attached to the lowermost end of the parison programming shaft 2; a mandrel 5 which encircles the parison programming shaft 2; a plurality of control rings 6b to 6e which are mounted on the mandrel 5; a plurality of sleeves 7a to 7f which are installed around the mandrel 5; a housing 8 which holds therein the above members; a controlling member 9 which is movably attached to the bottom part of the housing 8 and around the lowermost sleeve 7f; a die supporting member 10 which is attached to the bottom face of the housing 8; and a die 4 which is supported by the die supporting member 10 and encircles the core pin 3.

The above die assembly 1 will now be described in more detail.

The parison programming shaft 2 is interlocked with a parison programmer (not shown) and it drives the core pin 3 that is attached to the lowermost end of shaft 2, thereby controlling the quantity of thermoplastic resin that is extruded through the die 4.

Figure 2:
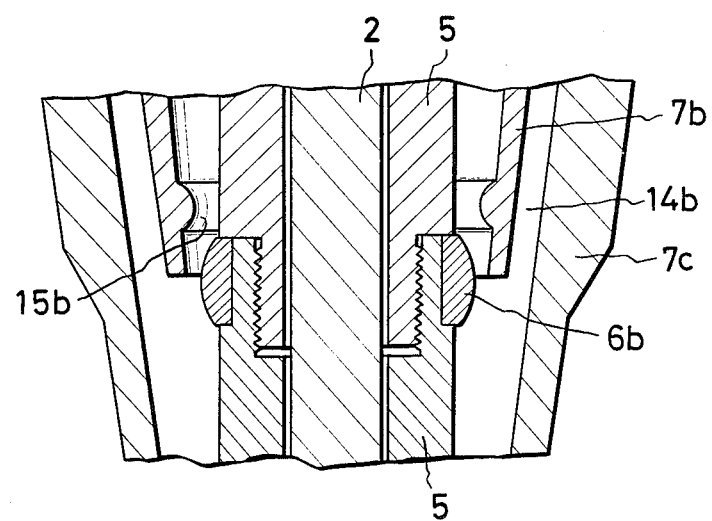
FIG. 2 is an enlarged cross sectional view of a control ring in the die assembly.

The parison programming shaft 2 is passed through the axis of the mandrel 5. Around the mandrel 5 is provided with a plurality of control rings 6 spaced axially at predetermined intervals. In the embodiment on the drawing, there are four control rings from 6b to 6e. In order to facilitate the assembling of the die assembly 1 and the exchanging of control rings 6b to 6e, constituent tubular parts of the mandrel 5 are connected by screw threads at each control rings, which is shown in FIG. 2 in connection with the control ring 6b.

A plurality of sleeves are mounted around the mandrel 5. In this embodiment, the number of sleeves are six, 7a to 7f. The outer configuration of the lower part of each sleeve is inverted frustoconical and the cylindrical portion and the frustoconical portion of a sleeve is received within the next lower sleeve. A resin passage is formed between the above frustoconical face and the inner wall surface of the lower sleeve.

The first sleeve 7a is disposed at the upper end of the mandrel 5 and an inclined resin passage of a groove 12a is formed around the sleeve 7a. This inclined groove 12a communicates with a resin inlet port 13a which is formed of both the aperture in the wall of the sleeve 7b and the aperture in the wall of the housing 8.

The second sleeve 7b is disposed also around the mandrel 5 and under the sleeve 7a to receive the sleeve 7a therein. Like the sleeve 7a, it has an inclined groove 12b which communicates with a resin inlet port 13b which is formed of both the aperture in the wall of the next sleeve 7c and the aperture in the wall of the housing 8.

Between the sleeve 7a and sleeve 7b is formed a conical gap 14a so that a thermoplastic resin material is fed from the inlet port 13a and passed downward to the groove 12a and next to the gap 14a. On the inside wall near the lower end of the sleeve 7b is formed an annular rib 15b and this rib 15b together with the control ring 6b regulate the cross-sectional area of the lower part of the gap 14a. The configuration of the annular rib 15b is predetermined, however, the curvature and height of the control ring 6b can be altered by exchanging for any suitable one. Therefore, the clearance of the gap 14a at the control ring 6b can be adjusted in accordance with the kind and the physical properties of the resin material that is passed through the gap 14a.

As described above, a resin material is fed through the inlet port 13a, groove 12a and gap 14a, while another resin material is fed through the next inlet port 13b, groove 12b and gap 14b. The two kinds of resin materials meet at a position below the control ring 6b, so that the ratio of quantities (thickness ratio) of both materials can be freely controlled by adjusting the pressures of fed materials and selecting the shape of the control ring 6b.

The structure of the third to fifth sleeves 7c to 7e is almost the same as the second sleeve 7b. That is, around the mandrel 5, a sleeve receives an upper sleeve therein and it is provided with an inclined groove (12c to 12e) which communicates with an inlet port (13c to 13e).

Between the above-described adjacent pair of sleeves, an inverted frustoconical gap (14c to 14e) is formed. Other resin materials are fed through inlet ports 13c to 13e, grooves 12c to 12e and gaps 14c to 14e, respectively. Each resin material is put in layers on the outside of already formed resin layers, then the layers of resin materials are passed downward. The structures and functions of annular ribs 15c to 15e and control rings 6c to 6e are also the same as those in the case of the sleeve 7b.

The sixth sleeve 7f is disposed around the mandrel 5 and under the sleeve 7e. A controlling member 9 is disposed on the outside of the sleeve 7f and a die 4 is disposed under the sleeve 7f, thereby forming a gap 14f between the sleeve 7f and these members 9 and 4. In accordance with the embodiment shown in the drawing, the controlling member 9 is supported by the die 4 and the die 4 is supported by a die supporting member 10. Meanwhile, it is possible to attach the controlling member 9 directly to the bottom part of the housing 8 by means of screw threads 8a so as to be vertically adjusted.

Like the foregoing sleeves, an inclined groove 12f is formed around the sleeve 7f and the groove 12f communicates with an inlet port 13f that is formed in the lower wall portion of the housing 8. The vertical position of the controlling member 9 supported on the die 4 is adjusted by the set bolts 11 which are fitted to the supporting member 10. (In the case that the controlling member 9 is attached to the housing 8 by screw threads 8a, the position of controlling member 9 is adjusted by turning the controlling member 9 itself.) Therefore, the clearance in the tapered portions of the gap 14f can be regulated, which is quite effectual for controlling the thickness of most important outermost layer of a parison.

The thickness-controlled resin material fed through the inlet port 13f, groove 12f and gap 14f is put on the outside of the flow of resin layers that are supplied from the preceding process and then the combined mass of resin layers flows into the resin passage 16 that is formed between the die 4 and the core pin 3. In this resin passage 16, the overall thickness of the resin layers is controlled by slightly moving the core pin 3 in the die 4 by the parison programming shaft 2.

The die assembly for extruding multilayer parisons according to the present invention is used by being attached to a preceding step in blow molding machine, where the foregoing resin inlet ports 13a to 13f are connected to respective extruders for resin materials.

As will be understood from the embodiment shown in the drawings, the material fed from the inlet port 13a forms an innermost layer and the material from the inlet port 13b is fitted over the innermost layer and further, the materials from the inlet ports 13c to 13f are applied one by one on the outside of the inner layers.

Examples of these resin materials is shown in the following Table 1.

Incidentally, the materials indicated in Table 1 are merely examples and it should be noted that the present invention is by no means restricted to the foregoing description on the embodiment. Furthermore, the number of resin layers in the embodiment is six, however, the parisons having different number of layers can easily be produced by changing the number of sleeves 17b to 17e.

TABLE 1

| Layer | Inlet Port | Wt. Ratio (%) | Example of Materials |
|---|---|---|---|
| Innermost Layer | 13a | 20 | Polyethylene, polypropylene, polycarbonate |
| Adhesive Layer | 13b | 10 | Admer (Trademark, Mitsui Petrochemicals Industries, Ltd.) |
| Barrier Layer | 13c | 10 | Nylon (Trademark, du Pont) polyvinylidene chloride, polyacrylonitrile, ethylene-vinylacetate copolymer |
| Adhesive Layer | 13d | 10 | Admer |

TABLE 1-continued

| Layer | Inlet Port | Wt. Ratio (%) | Example of Materials |
|---|---|---|---|
| Recycle Layer | 13e | 20 | Reuse resin material such as flashes and condemned products |
| Outermost Layer | 13f | 30 | Polyethylene, polypropylene, polycarbonate, polyvinylchloride ethylene-vinylacetate copolymer |

What is claimed is:

1. A die assembly for extruding multilayer parisons which comprises a parison programming shaft, having a lowermost end; a core pin which is attached to said lowermost end of said parison programming shaft; a mandrel which encircles said parison programming shaft; a plurality of control rings which are mounted on said mandrel at predetermined intervals; a plurality of sleeves which are installed around said mandrel, and each said sleeve has an outside wall that is provided with an inclined groove and has a lower part which is of an inverted frustoconical shape; each said sleeve having an inner wall, with a lower end, an annular rib formed on said lower end of said inner wall of each said sleeve, a housing which holds therein the above members; the housing having a bottom part; a controlling member to control the resin quantity of the outer layer of parisons, said controlling member is movably attached to said bottom part of said housing and around the lowermost of said sleeves; said housing bottom part having a bottom face; a die supporting member which is attached to said bottom face of said housing; and a die which is supported by said die supporting member and which encircles said core pin a resin passage in said die assembly is defined and regulated by each of said control rings together with said annular rib that is formed on said lower end of the respective said inner wall of said sleeve at said ring, by said controlling member acting together with said lowermost sleeve, and by said die acting together with said core pin.

* * * * *